United States Patent Office 2,965,664
Patented Dec. 20, 1960

2,965,664

PROCESS OF PREPARING NEUTRAL PHOSPHORUS- AND SULFUR-CONTAINING COMPOSITIONS

Thomas A. Butler, Cleveland, Ohio, assignor to The Lubrizol Corporation, Wickliffe, Ohio, a corporation of Ohio No Drawing. Filed Apr. 9, 1956, Ser. No. 576,757

11 Claims. (Cl. 260—461)

This invention relates to the chemistry of certain organic phosphorus- and sulfur-containing acids and in a more particular sense it relates to a process for the preparation of neutral reaction products from these acids.

The products of the hereinafter disclosed process are of value in many industrial applications, as for example in lubricants, metal-finishing agents, leather tanning assistants, and in many other applications.

It is a principal object of the present invention to provide a process for the preparation of neutral phosphorus- and sulfur-containing compositions.

It is also an object of the present invention to provide a process for the preparation of products substantially free from objectionable odor.

It is a further object of the invention to provide products which are useful as lubricant additives.

These and other objects are accomplished by the process described herein which comprises bubbling an inert gas through a reaction mixture containing a phosphorus thioic acid and an organic compound selected from the class consisting of epoxides and thioepoxides.

The process of the invention may be described more narrowly as comprising bubbling an inert gas through a reaction mixture containing:

A. A phosphorus thioic acid having the structure

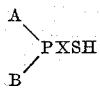

where A and B are the same or different radicals selected from the class consisting of RO, RS, HS, HO and R, where R is an organic radical at least one of A and B being an organic radical, and X is oxygen or sulfur, with B. An approximately equivalent amount of an organic compound selected from the class consisting of epoxides and thioepoxides.

The organic radicals in the above structure are preferably non-functional, which is to say that they do not take part in or have any significant influence upon the reaction of the process. Such radicals A and B, may in a preferred instance be selected from the radicals R, RO, and RS, and R', R'O, and R'S respectively. Thus the preferred phosphorus thioic acid starting materials are the phosphinothioic and the phosphorothioic acids. Of these the dithioic acids having the structures

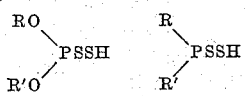

are particularly preferred. R and R' in the above structural formulae represent organic radicals each bound to the rest of the molecule through a carbon atom. These radicals may be aliphatic, cycloaliphatic, or aromatic and may contain organic or inorganic substituents. Illustrative types of organic radicals include alkyl, cycloalkyl, aryl, aralkyl, alkaryl, alkenyl, cycloalkenyl, etc. and the substituted derivatives of these; e.g., nitro-, halo-, alkoxy-, hydroxy-, carboxy-, etc. Thus suitable organic radicals would include; e.g., methyl, ethyl, n-propyl, isopropyl, n-butyl, isobutyl, amyl, isoamyl, n-hexyl, methylamyl, cyclohexyl, chlorocyclohexyl, methylcyclohexyl, heptyl, n-octyl, tert-octyl, nonyl, lauryl, cetyl, phenyl, bromophenyl, nitrophenyl, anisyl, ethylphenyl, propylphenyl, butylphenyl, amylphenyl, benzyl, phenethyl, allyl, octenyl, cyclohexenyl, etc.

The phosphinodithioic acids may be prepared most conveniently by the process described in copending application, Serial No. 406,323, filed January 26, 1954. This process comprises the reaction of an aromatic compound with phosphorus pentasulfide in the presence of an aluminum halide. Other means of preparing phosphinodithioic acids involve either the reaction of a Grignard reagent with phosphorus pentasulfide or sulfurization of a secondary phosphine.

The phosphorodithioic acids may be prepared by the reaction of phosphorus pentasulfide with the hydroxy compound which corresponds to the organic radicals R and R'. This reaction is illustrated by the action of phosphorus pentasulfide on ethyl alcohol to produce O,O-diethyl phosphorodithioic acid.

The organic epoxides and thioepoxides may be represented as having the structural grouping

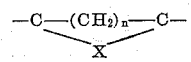

where X is oxygen or sulfur and $n$ is 0 or 1. Those epoxides and thioepoxides are preferred in which one of the carbon atoms attached to X is attached also to two hydrogen atoms. In other words, the preferred compounds are terminal epoxides and thioepoxides and have the structural grouping

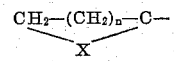

where $n$ is 0 or 1. These have been given the name terminal epoxides and thioepoxides because they may be thought of as being derived from a vinyl compound or one which has a terminal olefinic double bond.

Specific examples of suitable epoxides include ethylene oxide, propylene oxide, epichlorohydrin, 1-butene oxide, butadiene monoxide, 1-amylene oxide, styrene oxide, trimethylene oxide, 9,10-epoxystearic acid, etc.

As noted previously, the process of the invention contemplates the use either of epoxides and thioepoxides. As a matter of convenience, the term epoxide is used hereinafter in a broad sense to indicate both the epoxides and thioepoxides.

The value of the hereindescribed process rests with the quality of the product produced thereby, and is critically dependent upon the step of bubbling an inert gas through the reaction mixture. The inert gas may be selected from among a wide range of gases, such as carbon dioxide, nitrogen, propane, air, etc. The product which results from this process is distinguished from similar products prepared by a process which does not include this step, by the fact that it is relatively inoffensive as regards odor.

If such a phosphorus thioic acid-epoxide product is prepared without the step of bubbling an inert gas through the reaction mixture, it is characterized by a somewhat objectionable odor. The inclusion of the above-described step in the process, however, results in a product which does not have this characteristic, objectionable odor.

The mechanism by which this bubbling through of gas may serve to eliminate an offensive odor from the product is not readily discernible. It may well be that some reactive impurity or decomposition product present with the phosphorus thioic acid, such as hydrogen sulfide, reacts with the epoxide to produce an objectionably odorous compound and that even a trace of this latter compound is sufficient to impart a noticeably bad odor to the principal product. The step of bubbling an inert gas through the reaction mixture would serve the purpose of removing such an impurity or decomposition product by entrainment before it could react sufficiently with the epoxide to form a malodorous product.

The above explanation is only a hypothesis which remains unproven and it is not intended that the invention should be based upon or restricted to such a consideration. The hypothesis is presented here solely as a suggestion which may serve to advance the art.

The normal reaction of a phosphorus thioic acid with an epoxide is in many cases an exothermic reaction and may be conducted throughout a wide range of temperature. Temperatures down to −60° C. and lower have been found to be satisfactory while higher temperatures, i.e., 150° C. and higher, likewise are satisfactory. It is preferred to control the temperature of the reaction so that it is reasonably constant.

The process is illustrated in greater detail by the following examples:

Example 1

A stream of carbon dioxide was bubbled through 1675 grams (5.0 equivalents) of di-(2-methyl-pentyl-4) phosphorodithioic acid. To this there was added portionwise at 40° C., 319 grams (5.5 equivalents) of propylene oxide. The resulting mixture was concentrated by heating to a final temperature of 40° C./20 mm. The clear liquid residue has the following analyses:

Percent phosphorus _____ 8.0
Percent sulfur _____ 16.7
Acid number _____ 0.7

Example 2

A stream of nitrogen was bubbled through 1005 grams (3.0 equivalents) of di-(2-methyl-pentyl-4) phosphorodithioic acid at room temperature. To this there was added 191 grams (3.3 equivalents) of propylene oxide. The unreacted propylene oxide was removed by distillation to yield a liquid residue showing the following analyses:

Percent phosphorus _____ 7.9
Percent sulfur _____ 17.0
Acid number _____ 0.4

Example 3

A sample of di-(2-methyl-pentyl-4) phosphorodithioic acid weighing 1005 grams (3.0 equivalents) was cooled to −25° C. by the addition of Dry Ice and then treated portionwise with 191 grams (3.3 equivalents) of propylene oxide. Carbon dioxide bubbled through the mass as a result of the gasification of the Dry Ice. The temperature of the mixture was maintained relatively constant at −25° C. throughout the addition of propylene oxide. When the addition was completed, the product mixture was concentrated by heating to a final temperature of 40° C./20 mm. The residue showed the following analyses:

Percent phosphorus _____ 8.0
Percent sulfur _____ 17.0
Acid number _____ 1.7

Example 4

A sample of di-(2-ethylhexyl) phosphorodithioic acid weighing 768 grams (2.0 equivalents) was cooled by the addition of Dry Ice. To this was added 97 grams (2.2 equivalents) of similarly cooled ethylene oxide. Carbon dioxide bubbled through the mass as a result of the gasification of the Dry Ice. The addition was made very slowly and with continued stirring over a period of one hour, after which the mixture was allowed gradually to reach room temperature. The resulting product showed the following analyses:

Percent phosphorus _____ 7.7
Percent sulfur _____ 15.7

Example 5

A solution of 325 grams (0.08 equivalent) of a phosphorodithioic acid prepared by the reaction of phosphorus pentasulfide with a polyisobutyl substituted phenol in 325 grams of chloroform was cooled to −50 to −60° C. by the addition of Dry Ice. This solution then was treated dropwise over a period of two minutes with 12 grams (0.2 equivalent) of propylene oxide. This mixture was stirred for 3.5 hours during which time the temperature was allowed to rise to 2° C. Carbon dioxide bubbled through the mass as a result of the gasification of the Dry Ice. The product was concentrated by heating to a final temperature of 40° C./10 mm. The liquid residue showed the following analyses:

Percent phosphorus _____ 0.7
Percent sulfur _____ 1.5

As indicated earlier the products of this invention are of value in many industrial applications. A particularly valuable use of these compositions is as additives for use in fluid and semi-fluid lubricants. Thus lubricants which are intended for use in crankcases of internal combustion engines are greatly improved by the incorporation into such lubricants of small amounts, of the order of 0.5–2.0 percent of these products. Such percentages of these compositions have the effect of inhibiting corrosion of the metal surfaces within the engine.

Another particularly desirable application involves the use of the products described herein in lubricants which are intended for use in the differential housings of automotive vehicles. Such lubricants are subjected to extreme pressures and the products of this invention when used in amounts of the order of 3.0–10.0 percent impart to such lubricants the ability to withstand such extreme pressures. They also impart a marked rust-preventive quality to the lubricants. A particularly satisfactory gear lubricant of this latter type is a mineral oil solution of 3.5 percent of the product of Example 1, 2.0 percent of chlorinated paraffin wax containing 40 percent of chlorine and 7.0 percent of an acidic organic phosphite prepared by the reaction of phosphorus trichloride with methylamyl alcohol. Such lubricants may, of course, contain minor amounts of other well-known additives such as anti-foam agents, etc.

Other modes of applying the principle of the invention may be employed, change being made as regards the details described, provided the features stated in any of the following claims, or the equivalent of such, be employed. The present application is a continuation-in-part of application Serial No. 484,558, filed January 27, 1955, and now abandoned.

I therefore particularly point out and distinctly claim as my invention:

1. The process of preparing substantially neutral phosphorus- and sulfur-containing compositions which comprises bubbling an inert gas through a reaction mixture, during the period of reaction, of a phosphorus thioic acid selected from the class consisting of phosphorodithioic acids and phosphinodithioic acids in which the organic radicals are selected from the class consisting of alkyl, cycloalkyl, aryl, arylalkyl, alkaryl, alkenyl and cycloalkenyl radicals, and a lower aliphatic oxide.

2. The process of claim 1 characterized further in that the phosphorus thioic acid is a phosphorodithioic acid having the structure

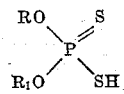

where R and R₁ are organic radicals selected from the class consisting of alkyl, cycloalkyl, aryl, aralkyl, alkaryl, alkenyl, and cycloalkenyl radicals.

3. The process of claim 1 characterized further in that the phosphorus thioic acid is a phosphorodithioic acid having the structure

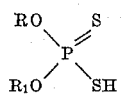

where R and $R_1$ are lower alkyl radicals.

4. The process of claim 1 characterized further in that the phosphorus thioic acid is a phosphorodithioic acid having the structure

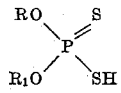

where R and $R_1$ are alkylphenyl radicals.

5. The process of claim 3 characterized further in that the lower alkyl radicals are hexyl radicals.

6. The process of claim 4 characterized further in that the alkylphenyl radicals are polyisobutyl-substituted phenyl radicals.

7. The process of claim 1 characterized further in that the lower aliphatic oxide is an alkylene epoxide.

8. The process of claim 2 characterized further in that the lower aliphatic oxide is propylene oxide.

9. A product prepared according to the process of claim 2.

10. A product prepared according to the process of claim 5.

11. A product prepared according to the process of claim 1.

References Cited in the file of this patent

UNITED STATES PATENTS

| | | |
|---|---|---|
| 2,726,208 | Karll | Dec. 6, 1955 |
| 2,783,202 | McDermott | Feb. 26, 1957 |
| 2,783,203 | McDermott | Feb. 26, 1957 |
| 2,783,204 | McDermott | Feb. 26, 1957 |

OTHER REFERENCES

Kabachnik, Zhur Obshchei Khim., vol. 25, pp. 2274–7 (1955).